(12) United States Patent
DiFalco et al.

(10) Patent No.: US 7,620,715 B2
(45) Date of Patent: *Nov. 17, 2009

(54) CHANGE EVENT CORRELATION

(75) Inventors: Robert A. DiFalco, Portland, OR (US);
Kenneth L. Keeler, Lake Oswego, OR (US); Robert L. Warmack, West Linn, OR (US)

(73) Assignee: Tripwire, Inc., Portland, OR (US)

( * ) Notice: Subject to any disclaimer, the term of this patent is extended or adjusted under 35 U.S.C. 154(b) by 133 days.

This patent is subject to a terminal disclaimer.

(21) Appl. No.: 11/171,955

(22) Filed: Jun. 29, 2005

(65) Prior Publication Data

US 2007/0005740 A1  Jan. 4, 2007

(51) Int. Cl.
*G06F 15/16* (2006.01)
*G06F 11/00* (2006.01)
(52) U.S. Cl. ......................................... 709/224; 714/48
(58) Field of Classification Search ................. 709/223, 709/224, 225, 226, 229; 707/101, 201, 202, 707/203; 714/48
See application file for complete search history.

(56) References Cited

U.S. PATENT DOCUMENTS

| 5,933,838 | A | * | 8/1999 | Lomet | 707/202 |
|---|---|---|---|---|---|
| 7,158,985 | B1 | * | 1/2007 | Liskov | 707/101 |
| 2004/0006614 | A1 | | 1/2004 | DiFalco | |
| 2004/0059770 | A1 | * | 3/2004 | Bossen | 708/530 |
| 2004/0059930 | A1 | | 3/2004 | DiFalco et al. | |
| 2004/0060046 | A1 | | 3/2004 | Good et al. | |
| 2004/0122962 | A1 | | 6/2004 | DiFalco et al. | |
| 2004/0123133 | A1 | | 6/2004 | DiFalco et al. | |

* cited by examiner

*Primary Examiner*—Paul H Kang
(74) *Attorney, Agent, or Firm*—Schwabe Williamson & Wyatt

(57) ABSTRACT

An automated method for facilitating management of a data processing environment is disclosed. In various embodiments, the method may include facilitating detecting of a change to an element of a data processing device of the data processing environment. In various embodiments, the method may further included facilitating correlating the change to one or more events associated with the element, and reporting the detected change for the element, supplemented with one or more of the correlated events of the element. Other embodiments of the present invention may include, but are not limited to, apparatus adapted to facilitate practice of the above-described method.

28 Claims, 5 Drawing Sheets

Fig. 2

CHANGE EVENT CORRELATION

FIELD

Disclosed embodiments of the present invention relate generally to the field of data processing, and more particularly to change event correlation in data processing environments.

BACKGROUND

Data processing devices are deployed in many different configurations and are used for many different applications in a variety of data processing environments. Unmanaged change may occur on one or a group of data processing devices, such as, for example, on one or a group of computers, and may lead to a number of deleterious effects. Similar situations may arise among a wide variety of data processing devices, including but not limited to switches, routers, and other networking devices of the like.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 illustrates a graphical user interface dialog associated with change event correlation, provided by one or more modules equipped to facilitate practice of at least some of the methods of the invention, in accordance with various embodiments of this invention;

DETAILED DESCRIPTION OF ILLUSTRATIVE EMBODIMENTS

Figure 1:
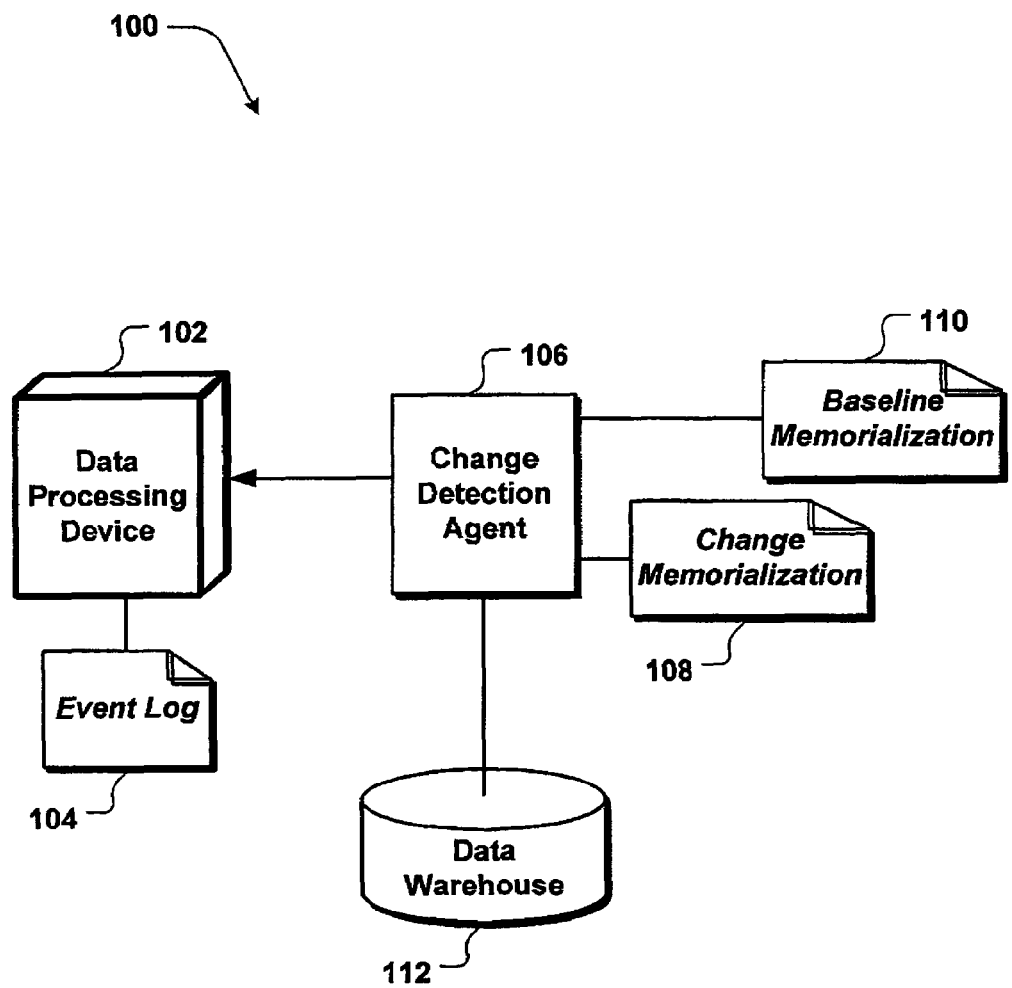
FIG. 1 illustrates some aspects of a data processing environment, in accordance with various embodiments of this invention.

Embodiments of the present invention include, but are not limited to, an automated method for facilitating management of a data processing environment. In various embodiments, the method may include facilitating detecting of a change to an element of a data processing device of the data processing environment. In various embodiments, the method may further included facilitating correlating the change to one or more events associated with the element, and reporting the detected change for the element, supplemented with one or more of the correlated events of the element. Other embodiments of the present invention may include, but are not limited to, apparatus adapted to facilitate practice of the above-described method. While portions of the following discussion may primarily be presented in the context of computers, it is understood that the principles described herein may apply to other data processing devices, including but not limited switches, routers, and other networking equipment of the like.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Parts of the descriptions of various embodiments will be presented in terms of operations performed by a processor-based device, using terms such as data and the like, consistent with the manner commonly employed by those skilled in the art to convey the substance of their work to others skilled in the art. As well understood by those skilled in the art, the quantities may take the form of electrical, magnetic, or optical signals capable of being stored, transferred, combined, and otherwise manipulated through mechanical and electrical components of the processor-based device; and the term processor includes microprocessors, micro-controllers, digital signal processors, and the like, that are standalone, adjunct or embedded.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in some embodiments" is used repeatedly. The phrase does not generally refer to the same group of embodiments, however, it may. The phrase "in various embodiments" is used repeatedly. The phrase does not generally refer to the same group of embodiments, however, it may. The terms "comprising," "having" and "including" are synonymous, unless the context dictates otherwise.

Some embodiments of the present invention include a scalable architecture to facilitate change event correlation. Such data processing devices may include but are not limited to networking devices, servers, desktop computers, laptop computers, tablet computers, personal digital assistants, cellular phones, set top boxes, media players, or other types of data processing devices. In some embodiments, a data processing environment may comprise a continuously or intermittently connected environment of data processing devices, including data processing devices communicating through the Internet. In some embodiments, a data processing environment may comprise a directly or indirectly connected environment of data processing devices, including data processing devices communicating through the Internet. In various embodiments, one or more modules may facilitate the operations described herein.

FIG. 1 illustrates some aspects of data processing environment 100, in accordance with various embodiments of this invention. Data processing environment 100 may include data processing device 102. Data processing environment 100 may include other data processing devices of one or more types. In various embodiments, data processing device 102 may comprise a computer, such as a server or a desktop computer. In various embodiments, data processing device 102 may comprise another type of data processing device, such as, for example, a networking device (a router, a switch, a gateway, or the like), a laptop computer, a tablet computer, a personal data assistant, a cellular phone, a set top box, a media player, or the like.

Illustrating a portion of a possible operational context in some embodiments, change detection agent 106 may facilitate detecting of a change to an element (not shown) of data processing device 102 of data processing environment 100. In various embodiments, an element may comprise, for example, a file of data processing device 102. In various embodiments, an element may comprise another component of data processing device 102. In various embodiments, change detection agent 106 may detected a change in an element and may memorialize the change detected in change memorialization 108. In various embodiments, change memorialization 108 may comprise a memorialization of one or more changes detected on one or more elements of data processing device 102.

In various embodiments, change memorialization 108 may comprise a file. In various embodiments, change memorialization 108 may comprise a different type of memorialization of a change detected. In various embodiments, change detection agent 106 may facilitate detecting a change by facilitating taking a snapshot of a current state (not shown) of an element of data processing device 102, and may further compare the snapshot to a previously taken snapshot (not shown) of the element. In various embodiments, change detection agent 106 may facilitate taking a snapshot of a current state of an element of data processing device 102 in the course of facilitating taking a snapshot of a set of elements of data processing device 102.

In some embodiments, the previously taken snapshot may include a baseline state of the element, with FIG. 1 illustrating some such embodiments with baseline memorialization 110 including a baseline state of the element. In some embodiments, the previously taken snapshot may represent a state other than a current baseline state. In some embodiments, change detection agent 106 may facilitate obtaining the previously taken snapshot of the element. In some embodiments, the previously taken snapshot of the element may be obtained in another manner.

Illustrating a portion of a possible operational context in various embodiments, event log 104 may comprise a number of logged occurrences of events or simply logged events associated with elements of data processing device 102. For example, in the case of a file comprising one type of element, all occurred events, or a subset of the occurred events, associated with the file may be recorded in event log 104, in accordance with some embodiments. In various embodiments, examples of such logged events may comprise when the file is accessed, modified, etc. As data processing device 102 may represent a broad range of devices, event log 104 may correspondingly represent a broad range of event logs and their accompanying constituents, and may involve, for example, TACACS (Terminal Access Controller Access Control System), XTACACS (Extended TACACS), TACACS+, RADIUS (Remote Authentication Dial-In User Service), Diameter, any AAA (Authentication, Authorization and Accounting) protocol, LDAP (Lightweight Directory. Access Protocol), and the like, including modifications, successors, and the like. Event logs may be referred to in a wide variety of ways, including audit logs, audit event logs, file audit logs, auto-logs, etc., with the term "audit" being used in a narrower context than used later herein in describing an audit of an enterprise, which may involve an examination and review of an enterprise's internal controls, information technology infrastructure, financial systems or data, business processes, financial accounting or reporting, etc.

In various embodiments, event log 104 may comprise a memorialization of one event or multiple events. In various embodiments, event log 104 may comprise a memorialization of one type of event, or multiple types of events. In various embodiments, event log 104 may comprise a running memorialization of events. In various embodiments, event log 104 may comprise events logged of one or more elements of data processing device 102. In various embodiments, event log 104 may reside on data processing device 102. In various other embodiments, event log 104 may reside elsewhere in data processing environment 100.

In various embodiments with one event log for data processing device 102, the event log may be created and/or updated by a software of data processing device 102. In some such embodiments, the software may comprise an operating system (OS), or its equivalent, of data processing device 102, while in other such embodiments, the software may comprise software other than an OS, or its equivalent, of data processing device 102. In some embodiments with multiple event logs for data processing device 102, at least one of the event logs may be created and/or updated by a software of data processing device 102. In some such embodiments, the software may comprise an OS, or its equivalent, of data processing device 102, while in other such embodiments, the software may comprise software other than an OS, or its equivalent, of data processing device 102.

Illustrating a portion of a possible operational context in various embodiments, change detection agent 106 may facilitate correlating the change to one or more events associated with the element. In various embodiments, change detection agent 106 may further report the detected change for the element, supplemented with one or more of the correlated events of the element. In some embodiments, the facilitating correlating may comprise retrieving the one or more events associated with the element from a first repository of events of data processing environment 100. In some embodiments, the first repository of events may comprise event log 104. In some embodiments, the first repository of events may comprise another data storage area of data processing environment 100.

In various embodiments, change detection agent 106 may further periodically comb one or more event logs of data processing device 102 for events logged for elements of data processing device 102, and may further deposit the combed events into a second repository. In various embodiments, the second repository may comprise data warehouse 112. Data warehouse 112 may comprise any type of data store or data storage place. In some embodiments, deposition of events in data warehouse 112 may facilitate retention of the events in cases where the first repository comprises a short-term repository. For example, in some embodiments, the first repository may only retain events for a designated time period or may otherwise roll over. In some such embodiments, the first repository may comprise event log 104. In various embodiments, the first repository of events may comprise another data storage area of data processing environment 100. In some embodiments, the first repository and the second repository may comprise the same data storage place.

In various embodiments, the combing may operate in such a manner as to commence combing at an event in an event log, or at a point in time in an event log, where a prior combing operation ended. In some embodiments, this combing method of operation may facilitate reducing or minimizing duplicative combing. In some embodiments, the combing may occur to the entire available event log. In other embodiments, the combing may occur in a different manner. In various embodiments, the combing may be facilitated via use of a filter. In some embodiments where combing may be facilitated via use of a filter, the filter may allow for combing of certain types or kinds of events. In other such embodiments, the filter may allow for combing in additional or alternative ways. In various embodiments, change event correlation may further comprise facilitating a user in configuring the filter. In some such embodiments, a user may be able to configure the filter to comb for certain types or kinds of events, while in other such embodiments, the filter may be configurable in additional or alternative ways.

In various embodiments, change detection agent 106 may facilitate definition of one or more responses upon detecting certain one or more events logged. In various embodiments, definition of one or more responses upon detecting certain one or more events logged may be otherwise facilitated. In various embodiments, the one or more responses may include a change detection scan. For example, in some embodiments where data processing device 102 comprises a router, change detection agent 106 may be configured to perform a change detection scan of data processing device 102 upon detecting certain one or more events logged. In some such embodiments, such an event may include, for example, a write command, while in other such embodiments, additional or alternative events may trigger a change detection scan. In various other embodiments, a change detection scan may be triggered upon detecting any number of designated events for various data processing devices.

In various embodiments, the one or more responses may include an automatic alert response. In various embodiments, an automatic alert response may comprise notifying a user, for example, a system administrator, of detection of the one or more events logged. In various embodiments, an automatic alert response may comprise creating a helpdesk incident. In various other embodiments, other responses may comprise an alert response upon detecting certain one or more events logged.

In various embodiments, change detection agent 106 may facilitate determining one or more users associated with the one or more correlated events. In various embodiments, change detection agent 106 may further report by supplementing the one or more correlated events of the element with the determined one or more users associated with the one or more correlated events.

In various embodiments, change detection agent 106 may facilitate designating a first subset of the plurality of events correlated with the change detected as having a higher probability of having caused the change detected than a second subset of the plurality of events. In various embodiments, the second subset may further include multiple segments, as in an example embodiment where the plurality of events correlated with the change detected are categorized into three groups, the first subset being categorized as likely to have caused the change detected, with the second subset including two segments of categorizations: (1) possibly having caused the change detected, and (2) unlikely to have caused the change detected. In various embodiments, the first subset and the second subset may comprise another number of different categorizations of probability of having caused the change detected.

In various embodiments, designating a first subset may be at least partially facilitated by use of groupings of types of events with types of changes. In some embodiments, for example, if the detected change is a changed hashing algorithm message digest of an element of data processing device 102, a write event associated with the element may be placed into the first subset of the plurality of events correlated, while a view event associated with the element may be placed in the second plurality of events correlated. In various embodiments, the designating may be at least partially facilitated by use of other groupings. In various embodiments, the designating may be at least partially facilitated by use of a historical association of events with detected changes. In some such embodiments, for example, a particular user's association with prior detected changes may increase the probability of the user's correlated events with a current detected change being placed in the first subset of the plurality of events as opposed to the second subset of the plurality of events correlated. In various other embodiments, another type of historical association of events with detected changes may be used.

In various embodiments, change event correlation may be performed to maintain or demonstrate control of an enterprise's information technology infrastructure. In various embodiments, change event correlation may be performed to maintain or demonstrate control of an enterprise's financial systems or data. In various embodiments, change event correlation may be performed to maintain or demonstrate control of an enterprise's business processes, such as, for example, enterprise resource planning (ERP) or customer relationship management (CRM). In various embodiments, change event correlation may be performed to facilitate compliance with governmental laws/regulations regarding establishment and maintenance of an internal control structure and/or procedures for financial reporting, such as, for example, the Sarbanes-Oxley Act (the Public Company Accounting Reform and Investor Protection Act), including any amendments and/or successor Acts to any part of the Sarbanes-Oxley Act, or the like.

In various embodiments, change event correlation may be performed to facilitate compliance with a number of laws, regulations, or guidelines, including but not limited to, the Gramm Leach Bliley Act, the regulations of Food and Drug Administration 21 Code of Federal Regulations 11, the Health Insurance Portability & Accountability Act, the Visa Cardholder Information Security Plan, the National Credit Union Administration Guidelines, the Office of the Comptroller of the Currency Guidelines, or the like, including any amendments and/or successors to any of the above, or the like.

In various embodiments, change event correlation may be performed as part of an audit of an enterprise, including but not limited to, a financial accounting or statement audit. In some such embodiments, change event correlation may be performed to at least provide an audit trail for said audit.

In various embodiments where change event correlation is performed to maintain or demonstrate control of an enterprise's information technology infrastructure, financial systems or data, or business processes, use of change event correlation may occur in a number of areas, including but not limited to, access control, network security, auditing and monitoring of security-related events, or the like. In various embodiments where change event correlation is performed to maintain or demonstrate control of an enterprise's information technology infrastructure, financial systems or data, or business processes, said maintenance or demonstration of control may include other aspects of an enterprise's information technology infrastructure, financial systems or data, or business processes, respectively.

In various embodiments where change event correlation is performed as part of an audit of an enterprise, or to facilitate compliance with governmental laws/regulations, use of change event correlation may occur in a number of areas, including but not limited to, access control, network security, auditing and monitoring of security-related events, or the like. In various other embodiments, where change event correlation is performed as part of an audit of an enterprise, or to facilitate compliance with governmental laws/regulations, use of change event correlation may include other aspects of an enterprise audit or regulatory compliance procedures, respectively.

In various embodiments, an apparatus to implement change event correlation may comprise a change control subsystem adapted to identify a change to an element of a data processing device of a data processing environment. In various embodiments, an apparatus to implement change event correlation may comprise an audit subsystem coupled to the change control subsystem to provide an audit trail of events and/or users associated the change. In various embodiments, each subsystem may include one or more modules adapted to implement their respective functions. In some embodiments, the audit subsystem may include a combing module to comb a plurality of logs of the data processing environments for events and/or users associated with the change. In various embodiments, the audit subsystem may additionally or alternatively include other modules.

Figure 2:
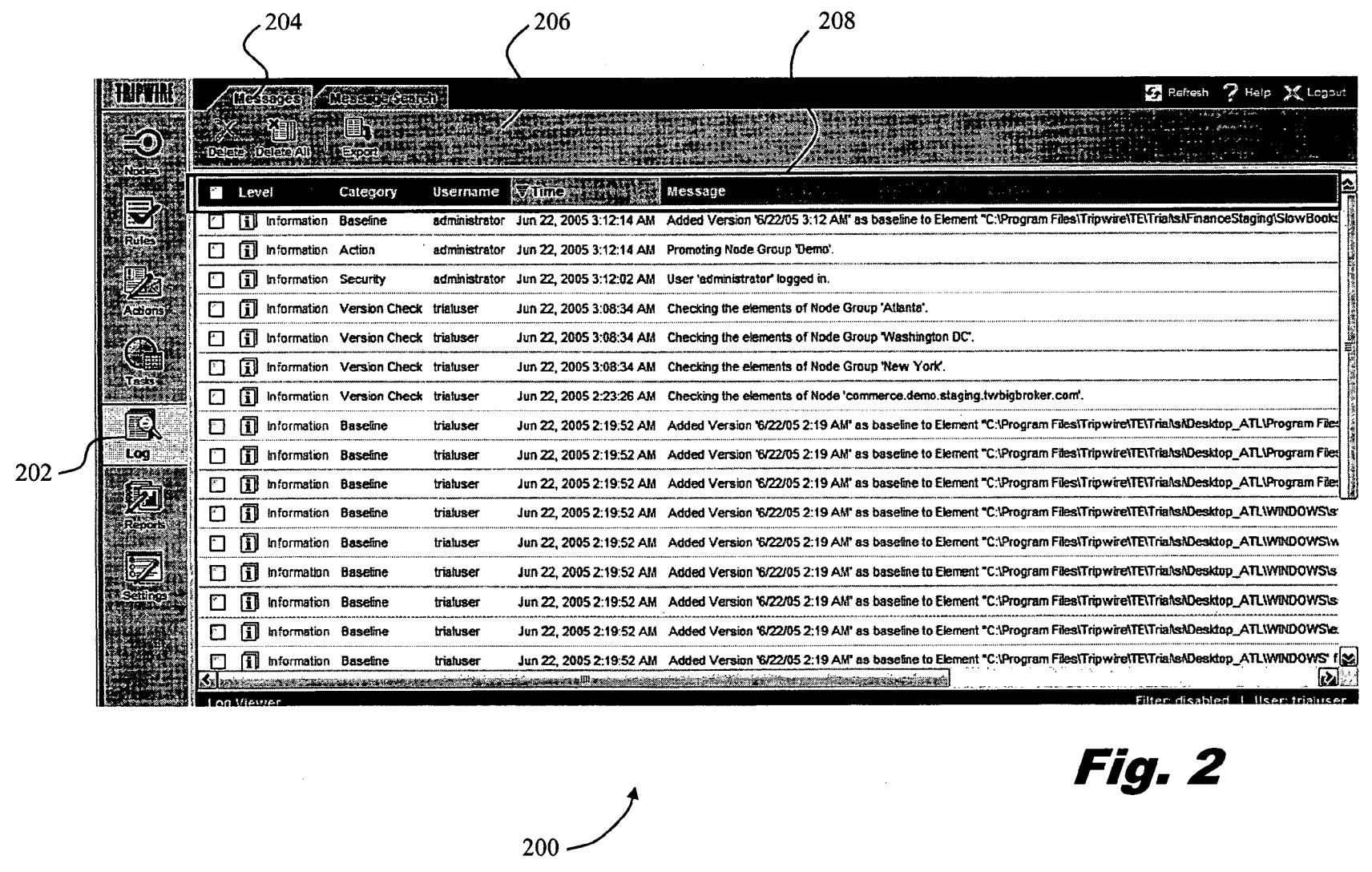

FIG. 2 illustrates graphical user interface dialog 200 associated with change event correlation, provided by one or more modules equipped to facilitate practice of at least some of the methods of the invention, in accordance with various embodiments of this invention. In other embodiments, different information may alternatively or additionally be displayed in such a graphical user interface dialog. In alternative other embodiments, other dialogs or their substantive equivalent may be provided.

Graphical user interface dialog 200 illustrates Log button 202, which may provide access to an event log manager (the main pane of the user interface of FIG. 2), in accordance with various embodiments of the invention. Messages tab 204 may allow for displaying information regarding event log messages. Horizontal button bar 206 may provide additional functionality under Messages tab 204, including the option to export log information to a file, for example, an XML (Extensible Markup Language) file. Main pane column headers 208 may allow sorting of event log messages by the contents of the respective columns contained in various embodiments of the invention, such as by time, etc.

Figure 3:
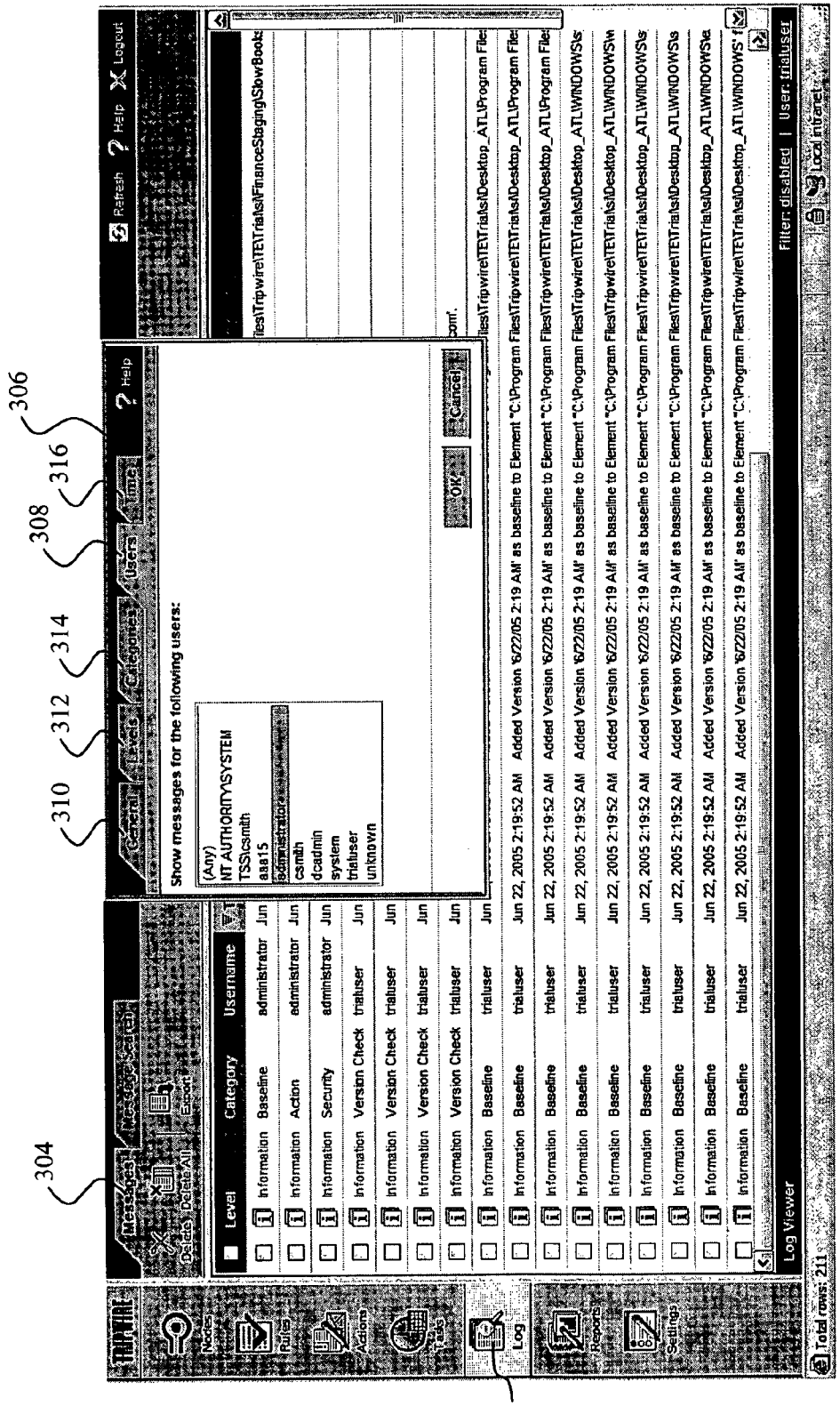
FIG. 3 illustrates a graphical user interface dialog associated with change event correlation, provided by one or more modules equipped to facilitate practice of at least some of the a methods of the invention, in accordance with various embodiments of this invention.

FIG. 3 illustrates graphical user interface dialog 300 associated with change event correlation, provided by one or more modules equipped to facilitate practice of at least some of the methods of the invention, in accordance with various embodiments of this invention. In other embodiments, different information may alternatively or additionally be displayed in such a graphical user interface dialog. In alternative other embodiments, other dialogs or their substantive equivalent may be provided.

Graphical user interface dialog 300 illustrates Log button 302, which may provide access to an event log manager (the main pane of the user interface of FIG. 3), in accordance with various embodiments of the invention. Messages tab 304 may further allow access to event log message filtering dialog 306.

Event log message filtering dialog 306 may have such filtering options as levels, categories, users, time, or the like, according to various embodiments. Users tab 308 may allow a user to filter event log messages according to username, including whether an event log message was generated by a system-initiated event (for example, a scheduled task) or a user-initiated event (for example, an event log message triggered by the activity of a specific user). Levels tab 312 may allow a user to filter event log messages according to the type of event log message, and may include such message types as information messages documenting an event, error messages documenting internal system errors or schedule overrun errors, or the like. Categories tab 314 may allow a user to filter event log messages according to the type of activity or event that generated the log message. Time tab 316 may allow a user to filter event log messages according to the date and time an event log message was created. General information tab 310 may allow enabling filtering of event log messages.

In various embodiments of the invention, filtering operations of event log messages may take a wide variety of forms, including filtering on a mostly user guided basis, to more automated filtering operations.

Figure 4:
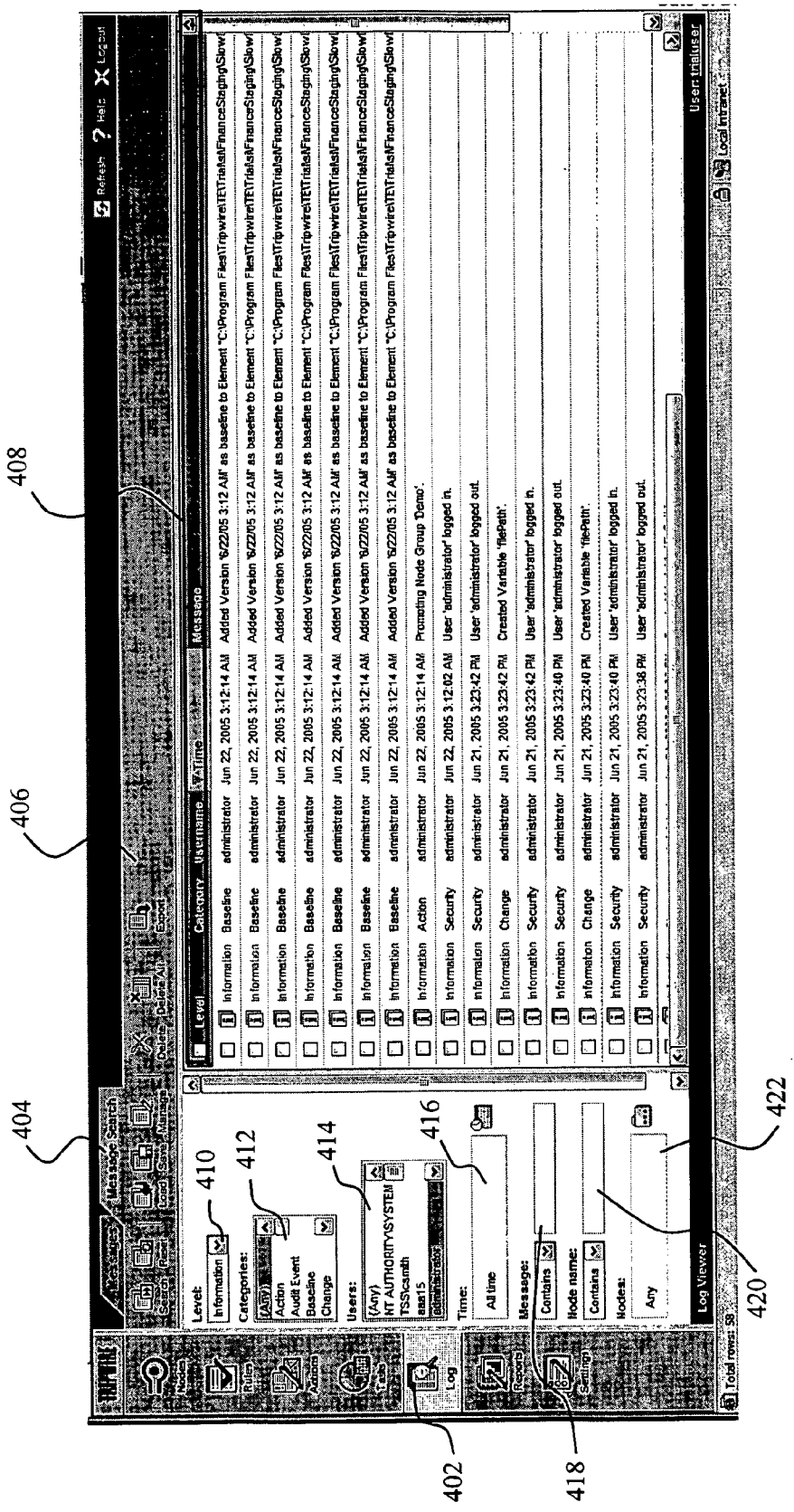
FIG. 4 illustrates a graphical user interface dialog associated with change event correlation, provided by one or more modules equipped to facilitate practice of at least some of the methods of the invention, in accordance with various embodiments of this invention.

FIG. 4 illustrates graphical user interface dialog 400 associated with change event correlation, provided by one or more modules equipped to facilitate practice at least some of the methods of the invention, in accordance with various embodiments of this invention. In other embodiments, different information may alternatively or additionally be displayed in such a graphical user interface-dialog. In alternative other embodiments, other dialogs or their substantive equivalent may be provided.

Graphical user interface dialog 400 illustrates Log button 402, which may provide access to an event log manager (the main pane of the user interface of FIG. 4), in accordance with various embodiments of the invention. Message Search tab 404 may allow for searching and displaying event log messages, subject to entered criteria. Horizontal button bar 406 may provide additional functionality under Message Search tab 404, including the option to export log information to a file, such as an XML file. Main pane column headers 408 may allow sorting of event log messages by the contents of the respective columns contained in various embodiments of the invention.

Level selector 410 may allow a user to search and display event log messages according to the type of event log message, and may include such message types as information messages documenting an event, error messages documenting internal system errors or schedule overrun errors, or the like. Category selector 412 may allow a user to search and display event log messages according to the type of activity or event that generated the log message. Users selector 414 may allow a user to search and display event log messages according to username, including-whether an event log message was generated by a system-initiated event (for example, a scheduled task) or a user-initiated event (for example, an event log message triggered by the activity of a specific user). Time selector 416 may allow a user to search and display event log messages according to the date and time an event log message was created. Message selector 418 may allow a user to search and display event log messages according to content of the summaries of the activities or events associated with the event log messages. Node name selector 420 may allow a user to search and display event log messages according to the contents of node names. Nodes selector 422 may allow a user to search and display event log messages specific to a designate node or group of nodes, according to various embodiments of the invention.

In various embodiments of the invention, search and display operations of event log messages may take a wide variety of forms, including from on a mostly user guided basis, to more automated operations.

Figure 5:
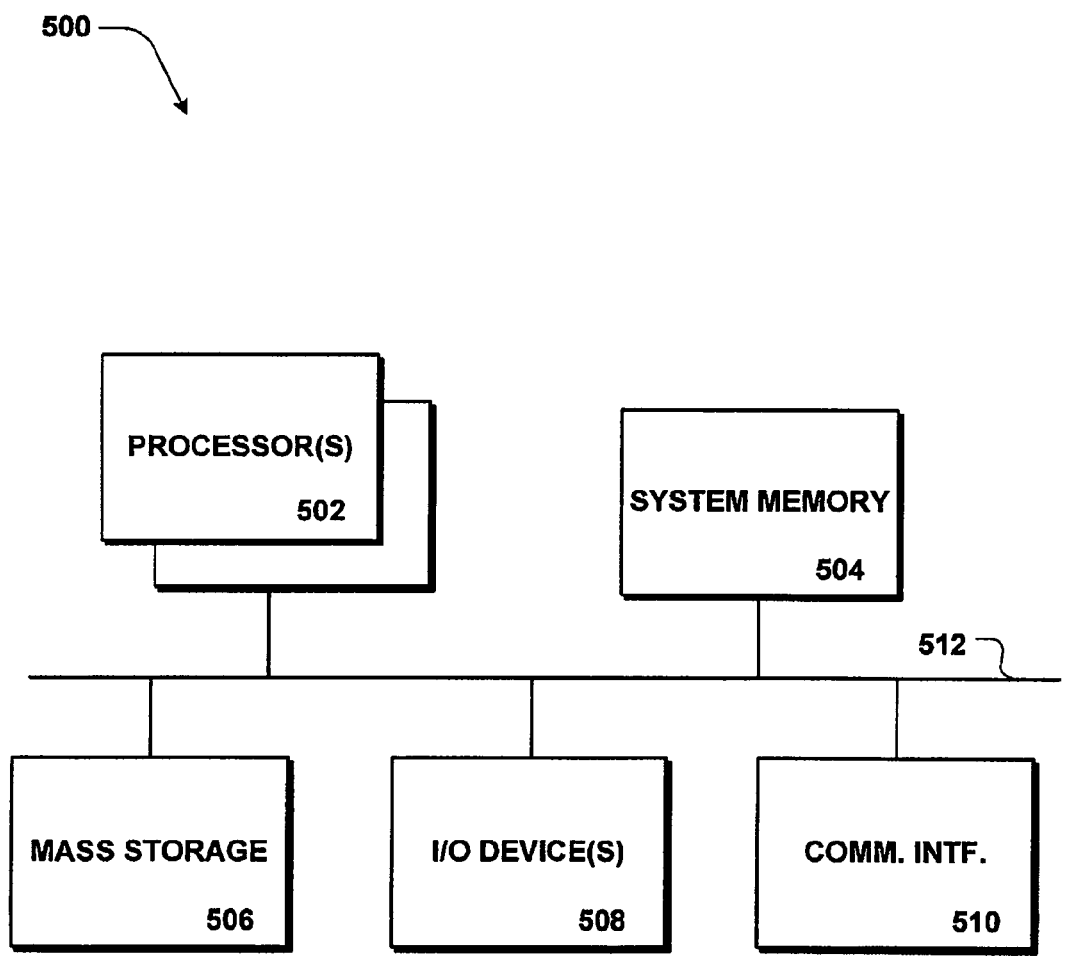
FIG. 5 illustrates an example computer system suitable for use in association with change event correlation, in accordance with various embodiments of this invention.

FIG. 5 illustrates an example computer system suitable for use in association with change event correlation, in accordance with various embodiments of this invention. As shown, computer system 500 may include one or more processors 502 and may include system memory 504. Additionally, computer system 500 may include mass storage 506 in the form of one or more devices (such as diskette, hard drive, CDROM and so forth), input/output devices 508 (such as keyboard, cursor control and so forth) and communication interfaces 510 (such as network interface cards, modems and so forth).

The elements may be coupled to each other via system bus 512, which may represent one or more buses. In the case where system bus 512 represents multiple buses, the multiple buses may be bridged by one or more bus bridges (not shown).

These elements each perform their conventional functions known in the art. In various embodiments, communication interfaces 510 may facilitate coupling of computing system 500 to a network, though which computing system 500 may be coupled to data processing device 102 of FIG. 1 and so forth, as necessary. In various embodiments, computing system 500 may at least be partially incorporated in a data processing device, such as data processing device 102 of FIG. 1. System memory 504 and mass storage 506 may be employed to store a working copy and a permanent copy of the programming instructions implementing various aspects of the one or more earlier described modules of the present invention. The permanent copy of the programming instructions may be loaded into mass storage 506 in the factory or in the field, through a distribution medium (not shown), or through communication interface 510 from, for example, a distribution server (not shown). The constitution of these elements 502-512 are known, and accordingly will not be further described. In alternate embodiments, part or all of the one or more modules may be implemented in hardware, for example, using one or more Application Specific Integrated Circuits (ASICs) instead.

Thus, it can be seen from the above description, an automated method for facilitating management of a data processing environment is described. In various embodiments, the method may include facilitating detecting of a change to an element of a data processing device of the data processing environment. In various embodiments, the method may further included facilitating correlating the change to one or more events associated with the element, and reporting the detected change for the element, supplemented with one or more of the correlated events of the element. Other embodiments of the present invention may include, but are not limited to, apparatus adapted to facilitate practice of the above-described method. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. An automated method for facilitating management of a data processing environment comprising:
   facilitating detecting of a change to an element of a data processing device of the data processing environment;
   facilitating correlating the change to one or more events associated with the element by retrieving the one or more events from a first repository of events of the data processing environment;
   reporting the detected change for the element, supplemented with one or more of the correlated events of the element;
   periodically combing one or more event logs of the data processing device of the data processing environment for events logged for elements of the data processing devices;
   depositing the combed events into a second repository;
   determining one or more users associated with the one or more correlated events, and the reporting further comprises supplementing the one or more correlated events of the element with the determined one or more user associated with the one or more correlated events; and
   designating a first subset of the plurality of events correlated with the change detected as having a higher probability of having caused the change detected than a second subset of the plurality of events.

2. The method of claim 1, wherein the facilitating detecting comprises facilitating taking a snapshot of a current state of the element, and comparing the snapshot to a previously taken snapshot of a prior state of the element.

3. The method of claim 2, wherein the prior state is a baseline state.

4. The method of claim 1, wherein at least one of the one of more event logs is created and/or updated by a software of the data processing device.

5. The method of claim 1, wherein the method further comprises facilitating definition of one or more responses upon detecting certain one or more events logged.

6. The method of claim 5, wherein the one or more responses include a change detection scan.

7. The method of claim 5, wherein the one or more responses include an automatic alert response.

8. The method of claim 1, wherein the combing is facilitated via use of a filter.

9. The method of claim 8, wherein the method further comprises facilitating a user in configuring the filter.

10. The method of claim 1, wherein the element comprises a file.

11. The method of claim 10, wherein said designating is at least partially facilitated by use of groupings of types of events with types of changes.

12. The method of claim 10, wherein said designating is at least partially facilitated by use of a historical association of events with detected changes.

13. The method of claim 1, wherein the data processing device, is a device selected from the group consisting of a networking device, a server, a desktop computer, a laptop computer, a tablet computer, a personal digital-assistant, a cellular phone, a set top box, and a media player.

14. The method of claim 1, wherein the method is performed to maintain or demonstrate control of an enterprise's information technology infrastructure.

15. The method of claim 1, wherein the method is performed to maintain or demonstrate control of an enterprise's financial systems or data.

16. The method of claim 1, wherein the method is performed to maintain or demonstrate control of an enterprise's business processes.

17. The method of claim 1, wherein the method is performed as part of an audit of an enterprise.

18. The method of claim 17, wherein the method is performed to provide an audit trail for said audit.

19. The method of claim 1, wherein the method is performed to facilitate compliance with governmental laws/regulations regarding establishment and maintenance of an internal control structure and/or procedures for financial reporting.

20. An apparatus comprising:
   a detection module adapted to facilitate detection of a change to an element of a data processing device of a data processing environment;
   a correlation module adapted to facilitate correlation of the change to one or more events associated with the element, and retrieve the one or more events associated with the element from a first repository of events of the data processing environment;

a combing module adapted to periodically comb one or more event logs of the data processing device of the data processing environment for events logged for elements of the data processing devices, and deposit the combed events into a second repository;

a reporting module operatively coupled to the detection and correlation modules, and adapted to report the detected change for the element, supplemented with the one or more correlated events of the element; and wherein the reporting module is further adapted to facilitate supplementing the correlated events of the element with a determined one or more users associated with the one or more correlated events; and wherein the apparatus further comprises a designation module adapted to facilitate designation of a first subset of the plurality of events correlated with the change detected as having a higher probability of having caused the change detected than a second subset of the plurality of events.

21. The apparatus of claim 20, wherein the detection module is adapted to facilitate detection by at least taking a snapshot of a current state of the element, and comparing the snapshot to a previously taken snapshot of a prior state of the element.

22. The apparatus of claim 20, wherein the apparatus further comprises a response definition module adapted to facilitate definition of one or more responses to finding certain one or more events.

23. The apparatus of 22, wherein the one or more responses include a change detection scan.

24. The apparatus of 22, wherein the one or more responses include an automatic alert response.

25. The apparatus of claim 20, wherein to the apparatus further comprises a filter adapted to the filter the logged events of the element.

26. The apparatus of claim 25, wherein said filtering is user-configurable.

27. The apparatus of claim 20, wherein the apparatus comprises one or more servers adapted to operate the detection and correlation modules.

28. The apparatus of claim 20, wherein the detection, correlation, and reporting modules are adapted to maintain or demonstrate control of one or more selected from the group consisting of an enterprise's information technology infrastructure, an enterprise's financial systems, an enterprise's financial data and an enterprise's business processes.

* * * * *

UNITED STATES PATENT AND TRADEMARK OFFICE
CERTIFICATE OF CORRECTION

| | | |
|---|---|---|
| PATENT NO. | : 7,620,715 B2 | |
| APPLICATION NO. | : 11/171955 | |
| DATED | : November 17, 2009 | |
| INVENTOR(S) | : Robert A. DiFalco et al. | |

It is certified that error appears in the above-identified patent and that said Letters Patent is hereby corrected as shown below:

Title Page, Item (57) Abstract reads "In various embodiments, the method may further included" and should read, --In various embodiments, the method may further include--

Column 10, lines 13 and 14 reads "the one of more event logs" and should read, --the one or more event logs--

Signed and Sealed this
Twentieth Day of December, 2011

David J. Kappos
*Director of the United States Patent and Trademark Office*